United States Patent [19]
Titus

[11] Patent Number: 6,065,781
[45] Date of Patent: May 23, 2000

[54] METHOD AND APPARATUS FOR PROTECTING THE WELD AREA OF POLYOLEFIN COATED PIPE

[75] Inventor: Paul E. Titus, Houston, Tex.

[73] Assignee: Power Lone Star, Inc., Houston, Tex.

[21] Appl. No.: 09/087,644

[22] Filed: May 29, 1998

[51] Int. Cl.⁷ .................... F16L 11/12; F16L 59/14
[52] U.S. Cl. .................. 285/55; 285/288.1; 285/47; 29/460
[58] Field of Search .................. 285/288.1, 288.5, 285/288.9, 47, 55; 29/460

[56] References Cited

U.S. PATENT DOCUMENTS

| | | | |
|---|---|---|---|
| 2,857,931 | 10/1958 | Lawton | 285/55 |
| 2,930,406 | 3/1960 | Galloway | 285/55 |
| 3,508,766 | 4/1970 | Kessler et al. | 285/55 |
| 3,711,124 | 1/1973 | Gerholt et al. | 285/47 |
| 3,731,710 | 5/1973 | Bauer et al. | 285/47 |
| 3,744,823 | 7/1973 | Muir et al. | 285/47 |
| 3,949,461 | 4/1976 | Thastrup | 285/47 |
| 4,019,761 | 4/1977 | Heidemann | 285/47 |
| 4,660,861 | 4/1987 | Argy et al. | 285/47 |
| 4,732,412 | 3/1988 | Van Der Linden et al. | 285/47 |
| 5,104,152 | 4/1992 | Galfant | 285/55 |

*Primary Examiner*—Eric K. Nicholson
*Attorney, Agent, or Firm*—Vinson & Elkins, L.L.P.

[57] ABSTRACT

A method and apparatus are disclosed for protecting the weld area of polyolefin-coated steel pipe with an epoxy-based coating. The epoxy-based coating adheres well to the metal of the pipe, but does not adhere well to the polyolefin pipe coating. An intermediate bonding material therefore is applied to that portion of the polyolefin pipe coating which will be overlaid by the epoxy-based coating, prior to applying the epoxy-based coating. The intermediate bonding layer selected is one which will adhere satisfactorily to the metal of the pipe, to the materials of the polyolefin coating and to the epoxy-based coating.

19 Claims, 1 Drawing Sheet

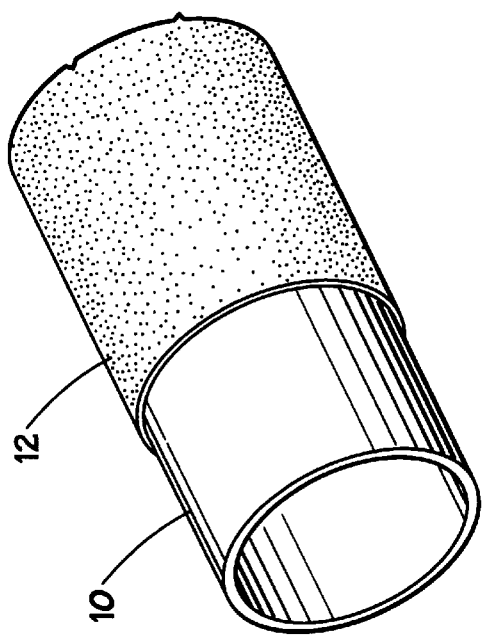
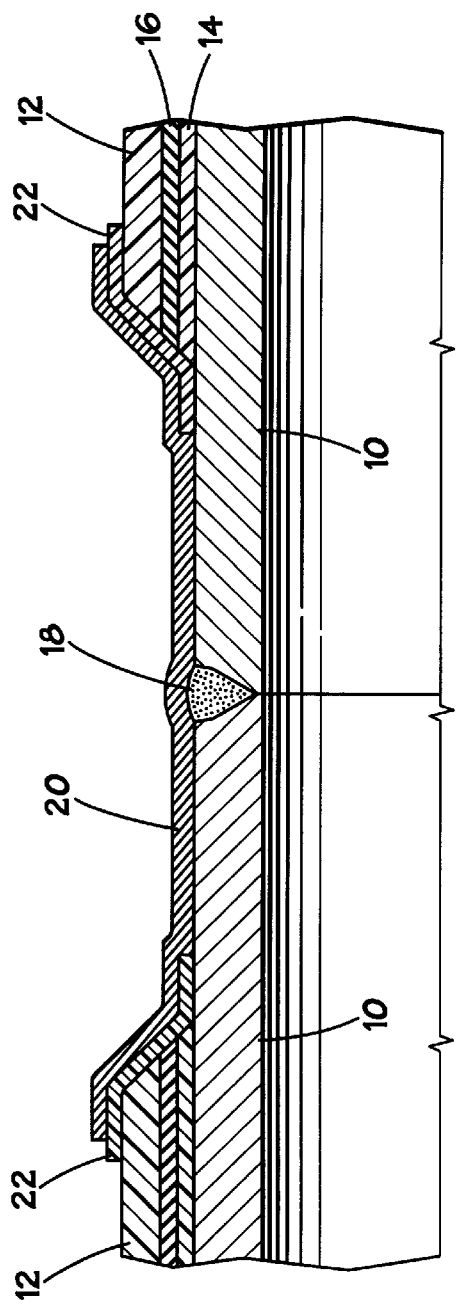

METHOD AND APPARATUS FOR PROTECTING THE WELD AREA OF POLYOLEFIN COATED PIPE

FIELD OF THE INVENTION

The present invention relates to an improved method and apparatus for protecting the weld area of co-joined lengths of polyolefin coated metal pipe and other polyolefin coated metal shapes and members, utilizing a field-applied epoxy-based protective coating.

BACKGROUND OF THE INVENTION

By government regulation, steel pipe used in buried pipelines must be provided with a protective coating. The water-proof coating provides corrosion protection and usually some degree of electrical insulation. A variety of coating materials are used, including polyethylene or other polyolefin-based coatings. Polyethylene and similar polyolefin-based pipe coatings are applied to the outer surface of steel pipe in a three step process. A thin layer of an epoxy-based coating is first applied, with excellent binding properties to the bare metal of the pipe. An adhesive coating, usually comprising a functionalized polyolefin, is applied over the epoxy and, finally, the polyethylene or other polyolefin-based outer coating of the pipe is applied over the adhesive coating. Once the coatings are set, the polyolefin outer coating is bonded securely to the adhesive intermediate layer, while the adhesive intermediate layer is bonded securely both to the polyethylene and to the epoxy layer, which in turn is bonded securely to the pipe. The result is a durable, and relatively inexpensive, polyolefin coating over the outer surface of the pipe, bonded securely to the pipe, through the intermediate layers, without substantial risk of delamination.

When lengths of polyolefin-coated pipe are joined by welding to form a pipeline or similar structure, it is necessary to have bare metal exposed in an area adjacent to the weld in order to form, clean and inspect the welded joint. Also, heat from the welding operation would tend to damage immediately adjacent polymer coating materials. Accordingly, it is customary to leave the pipe bare of coating material for a distance on each end. When two such lengths are joined by a weld, the length of bare metal pipe exposed on each side of the welded joint varies depending upon the diameter of the pipe and the coating material, but a distance of at least 6 inches from the end of each pipe section is typical. This leaves an area of at least 12 inches of bare metal pipe for each welded joint, which also provides room for a grinder to be applied to the pipe to clean the weld after it is completed.

The desired length of bare metal at each end of each length of coated pipe is left uncoated at the factory when the pipe coating initially is applied. Once the weld is completed and inspected, there is a length of uncoated steel pipe which must be provided with a suitable watertight corrosion-inhibiting protective coating prior to burying or other completion of the pipeline.

While it would be possible to apply a polyolefin coating in the weld area, following the same three layer coating process used for producing the original polyolefin coating, this process is difficult and expensive to utilize under field conditions. Accordingly, it is the primary object of the present invention to provide a method and apparatus for protecting the weld area of polyolefin coated pipe.

Another object is to provide a protective coating for the weld area of polyolefin coated pipe which may be applied easily, reliably and inexpensively under field conditions.

A further object is to provide such a protective coating for the weld area of polyolefin-coated pipe which, when applied, provides the same or substantially the same corrosion inhibiting and electrically insulating characteristics to the coated pipe in the weld area as are provided for the pipe body by the polyolefin coating.

A still further object is to provide such a protective coating for the weld area of polyolefin-coated pipe in which the weld area protective coating adheres well to, and does not tend to delaminate from, both the bare metal of the pipe in the weld area and the materials of the polyolefin coating on the body of the pipe.

SUMMARY OF THE INVENTION

In its preferred embodiment, the present invention relates to an improved method and apparatus for protecting the weld area of polyolefin-coated steel pipe with an epoxy-based coating. The epoxy-based coating adheres well to the metal of the pipe, but does not adhere well to the polyolefin pipe coating. In carrying out the method and apparatus of the invention, an intermediate bonding material is first applied to at least that portion of the polyolefin pipe coating which will be overlaid by the epoxy-based coating. The intermediate bonding layer selected is one which will adhere satisfactorily to the metal of the pipe, to the materials of the polyolefin coating and to the epoxy-based coating.

DESCRIPTION OF THE DRAWINGS

These and other objects and advantages of the present invention will become apparent from the following detailed disclosure and description of the preferred embodiment and from the drawings in which like numerals indicate like parts and in which:

FIG. 1 is an isometric view of one end of a length of pipe having a polyolefin protective coating disposed around the body of the pipe; and FIG. 2 is an enlarged detailed view, in cross-sectional elevation, of portions of two lengths of the FIG. 1 pipe welded together end-to-end and provided in the weld area with the epoxy-based protective coating in accordance with the present invention.

DESCRIPTION OF THE PREFERRED EMBODIMENT

Referring to FIG. 1, there is shown a length of steel pipe 10, the body of which is coated with a protective, corrosion-inhibiting and electrically-insulating polyolefin coating 12. The polyolefin coating is applied over the entire exterior length and circumference of the body of the pipe, except for the pipe ends, one of which is shown in FIG. 1, which are left uncoated for purposes of welding lengths of the pipe together to form a pipeline.

The polyolefin coating may be of any desired thickness, but most commonly is from about 50 mils to about 150 mils. The polyolefin coating may be formed using any conventional polyolefin pipe coating material, such as "Sclair 35 BP," DuPont of Canada, Mississsauga, Ontario, Canada. Such polyolefin pipe coating materials are relatively inexpensive, easy to apply and cure, and provide desirable characteristics for mechanical strength, corrosion protection and electrical insulation as required by federal regulations governing underground pipelines. Such polyolefin coatings do not, however, adhere satisfactorily to the bare metal of the pipe. Accordingly, they customarily are applied over intermediate coatings which provide the necessary adhesion characteristics.

As shown in FIG. 2, a thin layer of an epoxy-based material 14 first is applied directly to the outer surface of the pipe 10 by a suitable means such as spraying or floccing. Suitable epoxy-based materials include "ScotchKote 226N.", 3M Company, St. Paul, Minn. The epoxy material has the desirable characteristic of adhering strongly to the bare metal of the pipe. Since the polyolefin outer pipe coating 12 may not adhere well to the epoxy material, a thin intermediate layer 16 of an adhesive material such as "Fusabond EMB 158D", DuPont of Canada, Mississauga, Ontario, Canada, is applied over the epoxy layer 14 and the thicker polyolefin layer 12 is applied over the adhesive. The adhesive layer 16 has the desirable characteristics of bonding well both to the outer polyolefin layer and to the inner epoxy layer, thus providing a unitary bonded coating for the pipe utilizing a relatively thick layer of the less expensive polyolefin material, and relatively thinner layers of the more expensive epoxy and adhesive materials.

All three components used in providing the three-layer coating also may be purchased as systems such as TRISYS, manufactured by Elf-Atochem (France), Mapec, manufactured by Mannesmann Pipe & Steel Company (Germany) or Vanguard, manufactured by Polykem in the United States. Such systems include all three components, packaged separately for application as described above.

The epoxy, adhesive and polyolefin layers are applied in any suitable manner, well known to those skilled in the art. One such method is to place the pipe 10 on a rotating fixture and to apply the epoxy, adhesive and polyolefin layers serially by appropriate means, allowing each coating to cure partially prior to applying the next coating. The epoxy can be sprayed; the polyolefin and adhesive layers may be applied as extrusions, either through a cross lead die through which the pipe being coated is fed, or through a die placed laterally of the pipe so that the extruded coatings are wrapped around the pipe as the pipe is rotated. Upon cooling, all thee layers of the coating bond together in a unitary structure.

In FIG. 2 are illustrated two such polyolefin-coated pipe sections 10 joined together by weld 18. Although only a fragment of each pipe wall is illustrated in FIG. 2, it will be appreciated that weld 18 extends around the entire circumference of the pipes 10 to form a unitary structure of the two joined pipe lengths 10. The polyolefin coating is discontinuous in an area on either side of the weld 18, to thereby provide an annular area, extending entirely around the circumference of the joined pipes, in the vicinity of the weld 18, which is substantially free of the polyolefin pipe coating material.

After the weld 18 is finished and inspected, and prior to burial and use of the pipeline, it is necessary to provide an exterior protective coating over the bare metal of the pipe in the area of the weld 18. It also is necessary for the pipe coating material used in the area of the weld 18 to adhere well to the bare metal and to the materials used for forming the layers 12, 14, 16 of the polyolefin coating. While it would be possible to apply the same three layer polyolefin coating in the weld area, such three step coating process is difficult and expensive to apply under field conditions. A preferred alternative, therefore, is to use a different coating material which is easy to apply under field conditions and which provides the necessary protective, electrical insulating and corrosion inhibiting coating characteristics for the pipe.

In the preferred embodiment, an epoxy-based coating material is used to provide the protective outer coating in the vicinity of the pipe weld. U.S. Pat. No. 5,464,886 discloses an improved electrically nonconductive, insulative, water resistant polymer concrete coating suitable for use as a pipe coating which is formed from a mixture of an organic resin which acts as a cementing agent, a filler material and a chemical activator. Such material is referred to in U.S. Pat. No. 5,464,886, and herein, as an epoxy-based concrete.

The epoxy-based concrete pipe coating material comprises a mixture of an organic resin that acts as the cementing agent, a filler material and a chemical activator.

The organic resin preferably is a thermosetting polymer, such as an epoxy. Preferably, the organic resin is a mixture of a bisphenol A based epoxy and a polyglycol di-epoxide. A mixture composed of 40–60% of a bisphenol A based epoxy, for example, 50% of EPON® Resin 826 described in Technical Bulletin Shell Chemical Company, SC:235-82.826, Shell Chemical Company, 3200 Southwest Freeway, Suite 1230, Houston, Tex. 77027, and a 40–60% of a bisphenol A based epoxy blended with a polyglycol diepoxide, for example, 50% Araldite® 508 Flexible Liquid Epoxy Resin described in CIBA-GEIGY Product Data, CR 474B4M14, Resins Department, CIBA-GEIGY Corporation, Three Skyline Drive, Hawthorne, N.Y. 10532, is known to work. It is believed that an alternative organic resin mixture is between about 60–75% of a bisphenol A based epoxy and between 25–40% of a polyglycol di-epoxide.

The chemical activator preferably is an amine, such as a polyamine or polyamide. Aminoethylpiperazine is a chemical activator known to work. It is believed that an alternative chemical activator is tetraethylene pentamine.

The filler material is used to add bulk to the coating and to decrease the cost of the coating. Additionally, the filler material should improve the physical properties of the improved epoxy concrete coating. For example, it should absorb the exotherm connected with the chemical reaction of the organic resin with the chemical activator, thereby decreasing the possibility of cracking in the coating. It should also decrease the chance of shrinkage and increase the compressive and flexural strengths of the epoxy concrete coating. Finally, the filler material should be a size that allows the improved epoxy concrete coating to be sprayed. For example, filler material of up to 200 mesh in size is known to work. There are many filler materials that will satisfy these requirements. It is believed that acceptable filler materials include calcium carbonate, silica flour, zeospheres, talc and kaolin. It is known that calcium carbonate up to 200 mesh in size is an acceptable filler material.

The ratio, by weight, of the filler material to the organic resin described above is preferably between about 1:1 and 7:3. The ratio, by volume, of the chemical activator to the combination of organic resin described above and the filler material is preferably between about 1:8.75 and 1:10.75. These ratios allow the improved epoxy concrete to be sprayed, while maintaining the improved characteristics of the epoxy concrete coating of the present invention, including its strong bond to the steel of pipe 10, durability, electrical non-conductivity, insulative quality, and water resistance.

A suitably thick protective coating 20 of epoxy-based coating material, such as the concrete material of U.S. Pat. No. 5,464,886, may be applied directly to the uncoated pipe 10 and weld 18 and will adhere well directly to the bare metal. However, such an epoxy-based coating would not adhere as well to most polyolefin based pipe coating materials. Therefore, it is preferable to provide an intermediate layer of bonding material 22 between the epoxy layer 20 and the polyolefin layer 12. The intermediate bonding material 22 should completely cover any portion of the polyolefin coating 12 which is to be overlaid with the epoxy layer 20 and, as shown in FIG. 2, and preferably should extend slightly beyond the outer edge of the epoxy layer 20.

The intermediate bonding layer 22 may be of any suitable material which bonds well to the other materials present. Thus, it should bond satisfactorily to the steel of the pipe body 10, as well as to the epoxy, adhesive and polyolefin materials used in forming the polyolefin pipe coating and to the epoxy-based coating 20. It also should be relatively easy to apply in a thin continuous coating on the portion of the coated pipe where the polyolefin coating discontinues and the bare metal begins. While it might be applied over all of the bare metal in the area of the weld, this is an unnecessary step and expense, since the material of the epoxy-based coating 20 itself bonds satisfactorily to the bare metal. Suitable materials for the intermediate bonding layer 22 include butyl rubber-rich tape such as Filler Material #600 manufactured by Tek-Rap of Houston, Tex. Alternatively, a liquid butyl rubber composition could be sprayed or brushed on the same area and cured in place. Coal tar based adhesives also would be satisfactory and could be applied by spraying, brushing or other suitable means.

Other suitable epoxy-based coating materials, in addition to the epoxy concrete of U.S. Pat. No. 5,464,866, could be used for the outer epoxy layer and are within the scope of the invention.

In preparing the welded, coated pipe joint shown in FIG. 2, the two lengths of pipe 10, with polyolefin coating 12 disposed about the length of the bodies of the pipe, but with metal adjacent to the ends to be welded left bare, are placed end-to-end in abutting relationship. The circumferential weld 18 is then formed in the conventional manner, joining the two pipe segments about their circumference. Once the welded joint has been cleaned and inspected, a suitable layer of the bonding material 22 is applied, beginning on the outer surface of the polyolefin layer 12, covering the entirety of the joint between the polyolefin layer 12 and sublayers 14, 16 and the pipe metal and continuing onto the bare metal of the pipe 10. A suitably thick layer, generally about 40 mils, of a suitable epoxy-based material 20 is then applied on the entire outer surface of the weld area of the pipe, coating the weld and bare pipe surfaces, as well as the bonding layer 22 to provide a unitary watertight protective coating in the weld area.

As shown in FIG. 2, the layer of intermediate bonding material 22 preferably extends longitudinally along the outer surface of polyolefin pipe coating 12 in a direction away from the weld 18 for a slightly greater longitudinal distance than does the epoxy coating 20. This assures that the epoxy coating 20 is in bonding contact only with the intermediate bonding material 22 or with the metal of the pipe or weld and is not in direct contact with the polyolefin material of the pipe coating, where it might tend to delaminate.

More detailed disclosures of the composition, method of application and use of the preferred epoxy-based coating material are contained in U.S. Pat. No. 5,464,886, the entirety of which is hereby incorporated by reference.

The foregoing disclosure and description of the invention are illustrative and explanatory thereof, and various changes may be made in the size, materials and details of construction, in accordance with the appended claims, without departing from the spirit of the invention.

What is claimed is:

1. A coated, welded, pipe joint comprising:
    two lengths of steel of pipe laid end to end and joined at their proximate ends by a circumferential weld;
    a protective coating of polyolefin material on the outer surfaces of said two pipe lengths, said polyolefin material being discontinuous in the area of said weld, to provide an annular area on the outer surfaces of said pipe lengths in the area of said weld, said annular area being substantially free of said polyolefin coating material;
    a substantially continuous coating of epoxy-based pipe coating material applied over said annular area; and
    a nonepoxy based bonding material adapted to adhere to said pipe, to said polyolefin coating material and to said epoxy-based pipe coating material being interposed between, and in contact with each of, said epoxy-based pipe coating material and said polyolefin material,
    whereby a substantially continuous watertight protective coating is provided for said welded pipe joint in the area of said weld.

2. The pipe joint according to claim 1 wherein said polyolefin material comprises polyethylene.

3. The pipe joint according to claim 1 wherein said epoxy-based pipe coating material comprises a mixture of,
    an organic resin comprising between 60%–75% by weight of a bisphenol A based epoxy and between about 25%–40% by weight of a polyglycol di-epoxide,
    a filler material, and
    an amine curing agent.

4. The pipe joint according to claim 3 wherein said organic resin is produced by mixing a bisphenol A based epoxy and a blend of bisphenol A based epoxy and polyglycol di-epoxide.

5. The pipe joint according to claim 3 wherein said filler material consists substantially of particles up to 200 mesh wherein the ratio by weight of said filler material and said organic resin is between about 1:1 and 7:3.

6. The pipe joint according to claim 3 wherein said amine curing agent is selected from the group consisting of aminoethylpiperazine and tetraethylene pentamine.

7. The pipe joint according to claim 1 wherein said bonding material comprises a butyl-rubber rich mastic.

8. The pipe joint according to claim 1 where said adhesive bonding material is provided at each longitudinal edge of said annular area of said pipe joint, said adhesive bonding material beginning at a selected point spaced longitudinally away from said weld and on a portion of said annular area which is substantially free of said polyolefin coating material and continuing longitudinally away from said weld, across an edge of said polyolefin coating material and onto the outer surface of said polyolefin material coating.

9. The apparatus according to claim 1 wherein said epoxy-based pipe coating extends in overlapping relationship to at least a portion of said polyolefin material coating.

10. The pipe joint according to claim 9 wherein said bonding material extends in overlapping relationship to a portion of said polyolefin material coating for a distance longitudinally away from said weld which is greater than that of said epoxy-based coating.

11. A method for forming a coated, welded, pipe joint comprising:
    providing two lengths of steel pipe, each having a protective coating of polyolefin material disposed on the outer surface thereof, and each having an uncoated portion adjacent to an end thereof;

aligning said two lengths of said pipe in end-to-end relationship with their uncoated ends substantially abutting;

forming a circumferential weld joining the adjacent ends of said two lengths of pipe;

applying a nonepoxy based bonding material to the portion of each said pipe length where said polyolefin protective coating ends and said uncoated portion of said pipe length begins, said bonding material being applied in overlapping relationship to at least a portion of said polyolefin coating material and at least a portion of said uncoated pipe portion; and applying a substantially continuous coating of epoxy-based material over said weld, said uncoated portions of said two pipe lengths and at least a portion of said bonding material, whereby a substantially continuous watertight protective coating is provided for said welded pipe joint in the area of said weld.

12. A method according to claim 1 wherein said polyolefin material comprises polyethylene.

13. The method according to claim 11 wherein said epoxy-based material comprises a mixture of, an organic resin comprising between 60%–75% by weight of a bisphenol A based epoxy and between about 25%–40% by weight of a polyglycol di-epoxide, a filler material, and an amine curing agent.

14. The method according to claim 13 wherein said organic resin is produced by mixing a bisphenol A based epoxy and a blend of bisphenol A based epoxy and polyglycol di-epoxide.

15. The method according to claim 13 wherein said filler material consists substantially of particles up to 200 mesh wherein the ratio by weight of said filler material and said organic resin is between about 1:1 and 7:3.

16. The method according to claim 13 wherein said amine curing agent is selected from a group consisting of amino-ethylpiperazine and tetraethylene pentamine.

17. The method according to claim 11 wherein said bonding material comprises a butyl-rubber rich mastic.

18. The method according to claim 11 wherein said adhesive bonding material is applied so as to extend in overlapping relationship to at least a portion of said polyolefin material coating.

19. The method according to claim 18 wherein said bonding material extends in overlapping relationship to a portion of said polyolefin material coating for a distance longitudinally away from said weld, which distance is greater than that of said epoxy-based coating.

* * * * *